United States Patent [19]

Wenzel

[11] 4,222,752
[45] Sep. 16, 1980

[54] APPARATUS FOR THE SEPARATION OF ISOTOPES BY THE SEPARATING NOZZLE PROCESS

[75] Inventor: Werner Wenzel, Spellen, Fed. Rep. of Germany

[73] Assignee: NUSTEP Trenndüsen Entwickfungs- und Patentverwertungsgesellschaft mbH & Co. KG, Essen, Fed. Rep. of Germany

[21] Appl. No.: 928,436

[22] Filed: Jul. 27, 1978

[30] Foreign Application Priority Data

Sep. 15, 1977 [DE] Fed. Rep. of Germany ....... 2741461

[51] Int. Cl.² ............................................ B01D 59/00
[52] U.S. Cl. ...................................... 55/269; 55/342; 55/17
[58] Field of Search .......................... 55/17, 267–269, 55/342, 392, 66, 80, DIG. 14; 62/331

[56] References Cited

U.S. PATENT DOCUMENTS

| 2,372,316 | 3/1945 | Curtis | 55/342 |
| 3,747,306 | 7/1973 | Wikdahl | 55/17 |
| 4,093,436 | 6/1978 | Wenzel | 55/342 |
| 4,113,448 | 9/1978 | Haarhoff et al. | 55/17 |

FOREIGN PATENT DOCUMENTS

| 1444458 | 8/1970 | Fed. Rep. of Germany | 55/269 |
| 1794274 | 7/1972 | Fed. Rep. of Germany | 55/17 |
| 2542296 | 3/1977 | Fed. Rep. of Germany | 55/17 |

Primary Examiner—David L. Lacey
Attorney, Agent, or Firm—Karl F. Ross

[57] ABSTRACT

An apparatus for isotope separation has a plurality of separating stages connected in a separation cascade. Each of the stages has a separating-nozzle unit and a heat exchanger connected upstream of the unit for abstracting heat from the compressed gas forced through said unit. According to the invention the apparatus comprises a substantially cylindrical vessel having a generally horizontal axis and is subdivided internally by a plurality of diametral partitions defining chambers between them, each of the chambers receiving a respective one of said stages. All of the heat exchangers are in line with one another and are all at the same level in said vessel, the heat exchangers having common heat exchanger tubes extending substantially the length of the vessel through all of the chambers and through the partitions.

6 Claims, 1 Drawing Figure

U.S. Patent
Sep. 16, 1980
4,222,752
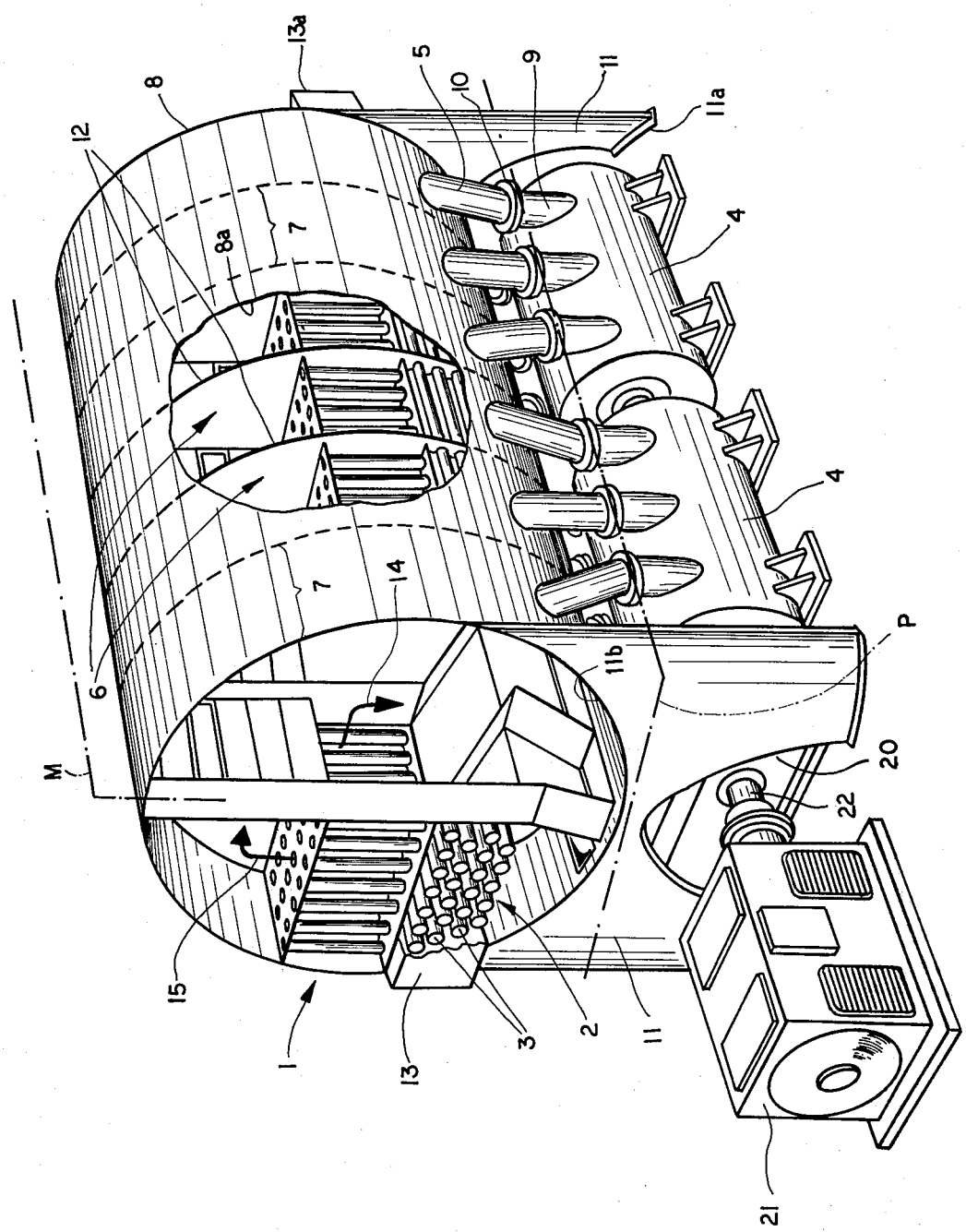

APPARATUS FOR THE SEPARATION OF ISOTOPES BY THE SEPARATING NOZZLE PROCESS

CROSS REFERENCE TO RELATED APPLICATIONS

This application is related to my commonly assigned copending application Ser. No. 888,974 filed Mar. 22, 1978 which is, in turn, related to the commonly assigned then-pending application Ser. No. 725,493, filed Sept. 22, 1976, now U.S. Pat. No. 4,093,436 of June 6, 1978.

FIELD OF THE INVENTION

The present invention relates to an apparatus for isotope separation by the separating-nozzle process and, more particularly, to a uranium-enrichment apparatus operating in the gas phase and which has an integrated arrangement of the various devices associated with this process.

BACKGROUND OF THE INVENTION

The separation of isotopes in the gas phase and, especially, uranium isotopes for uranium enrichment, based upon different molecular weights/or different kinetic cross sections of the molecules of the isotopes to be separated in the gas phase, can be effected by the separating-nozzle process well-documented in the literature and described in the aforementioned copending application, the art cited therein, the earlier application also mentioned above, and the publications identified below.

The gas mixture, in this system, is forced with or without a carrier (low-molecular-weight gas) through slit-like nozzles, the outflow of which is intercepted by skimmer-diaphragm arrangements which separate the molecules of heavier isotopes from those of the ligher isotopes.

The assembly of such nozzles and associated skimmer diaphragms are referred to hereinafter as separating-nozzle units or more generally, as separating units.

As described, inter alia, in the aforementioned copending application, it is common practice to feed each such separating-nozzle unit with a respective compressor and to connect the unit in cascade with other units for maximum resolution or separating efficiency.

The aforementioned applications, moreover, describe arrangements wherein at least part of the compression heat is removed from the gas by a cooler upstream of each unit.

Separating-nozzle units, their structural and operating principles and the various auxiliary device (compressors) used with these units are described in the following publications:

U.S. Pat. No. 3,362,131
U.S. Pat. No. 3,708,964
U.S. Pat. No. 3,877,892
German Pat. No. 1,052,955
German Pat. No. 1,096,875
German Pat. No. 1,198,328
German Pat. No. 1,794,274
German Pat. No. 2,031,687
German published application (Auslegeschrift) DT-AS No. 25 42 296
Chemie-Ingenieur-Technik, volume 29, pages 364 ff. (1977)
Chemie-Ingenieur-Technik, volume 39, pages 1 ff. (1967)
Atomwirtschaft/Atomtechnik, volume 13, pages 359 ff. (1968)

As described in the aforementioned applications, a plurality of separating-nozzle units can be functionally integrated into a separating cascade with the aid of a vacuum-type vessel having a circular-plan configuration (generally spherical in the latter application) and internally subdivided by radial partitions into sectors for the respective cascade stages.

The gas ducts can be arranged centrally in the sectors in the upper part of the vessel and as connecting passages between the compressors, the coolers and the central gap passages. The compressors may be mounted directly below the vessel.

Prior to this development and in most earlier applications of the process, the apparatus was functionally integrated into a separation cascade although the devices of the latter were usually not structurally integrated. The common practice was to provide the separating stages next to one another and to connect them with gas ducts which could be provided with enveloping or surrounding ducts (jackets) to limit the possibility of the escape of gas in the event of a failure in the system.

When a row of separate units was connected in cascade by such ducts, they had to be spaced widely to allow positioning of the compressors between them. As a result the apparatus needed long supply and feed lines for gas, cooling water etc. and was costly to construct and control.

Since all units and subassemblies of the apparatus had to be sealed vacuum tight against atmospheric pressure, the numerous failure-prone welded seams necessary to this end created problems and required high welding costs. All of these disadvantages were reflected in the high capital and operating costs of uranium enrichment of the separating-nozzle process.

While the system described in my above-mentioned application Ser. No. 725,493 (see German published application-Auslegeschrift-DT-AS No. 25 42 296 and U.S. Pat. No. 4,093,436) was free from the last mentioned group of disadvantages, work with this system has shown that it is capable of improvement. The system disclosed in my application Ser. No. 888,974, uses a generally spherical housing and is capable of providing simplification and improvement for systems having large gas throughputs which are to be processed.

The present invention is primarily concerned with an apparatus for uranium enrichment by the separating-nozzle process which thus comprises a plurality of separating-nozzle units as previously described, heat exchangers of the tube-bundle or, more particularly, of the tube-type upstream of the separating-nozzle units, compressors respectively associated with the separating-nozzle units and gas ducts for the supply of the starting gas and the functional integration of the separating-nozzle units into a separating cascade having a plurality of stages. With the system using an upright cylindrical configuration as just described, difficulties have been encountered with the orientation and disposition of the heat-exchanger sections. In general, the heat exchanger tubes in such constructions cannot be of the throughgoing type. It is difficult, moreover, in such systems to lead away and supply the coolant, generally water, to these heat exchangers.

OBJECTS OF THE INVENTION

It is the principal object of the present invention to provide an improved functionally and structurally integrated separating cascade for the separating-nozzle process of uranium enrichment whereby the disadvantages of earlier systems are avoided and the disposition and operation of the heat exchangers are greatly simplified.

Another object of the invention is to provide an integrated separating-nozzle apparatus for isotope separation.

Yet another object of the invention is to provide an apparatus for the separation of isotopes by the separating-nozzle process which represents an improvement over the art in more rationally mounting the heat exchangers associated with the separating-nozzle units.

SUMMARY OF THE INVENTION

These objects and others which will become apparent hereinafter are attained, in accordance with the present invention, in an apparatus for the separation of isotopes by the separating-nozzle process which comprises a cylindrical hermetically sealed vessel having a generally horizontal axis and supported above the compressor units on supports engaging opposite ends of the vessel, the compressors being disposed between the supports and within the plan outline of the vessel.

According to the invention, therefore, the vessel is generally recumbent and is supported upon spaced apart uprights, the interior of the vessel being subdivided by diametral partitions, all of the heat exchangers in the respective compartments being disposed at the same level. Heat-exchange tubes (of the heat exchangers in common) pass through all of the cascade stages and traverse the diametral partitions, the tubes being at one side in communication with a distribution manifold chamber and on the opposite side with a collection manifold chamber.

This system actually has the advantage that the heat exchanger tubes can be straight throughgoing tubes for all of the cascade stages and the supply of the cooling medium and its removal from the heat exchanger tubes can be greatly simplified over systems using individual heat exchangers for each cascade stage with respective coolant inlets and outlets.

Only the single supply manifold and the single collection manifold need be provided and the supply and collection chambers can be so constructed and arranged that in the individual heat exchanger tubes the cooling medium passes in counterflow.

The heat exchanger sections for each cascade stage can thus function as counterflow heat exchangers. The straight tubes of the heat exchanger facilitate mechanical cleaning of the heat exchanger tubes so that an auxiliary cooling cycle need not be provided if cleaning is required. Tubes which must be removed for maintenance or repair can easily be extracted and any welds required between the tubes and the sheets or partitions can be examined by nondestructive techniques such as subjecting them to penetrating X-rays or other straight-line radiation.

The posts which support the vessel can be formed as shields or shells which can be concave inwardly or toward one another to define a significant free space beneath the vessel to accommodate the compressors. In addition, they may have upwardly concave cutouts so that they can receive the cylindrical vessel as cradles therefore.

BRIEF DESCRIPTION OF THE DRAWING

The above and other objects, features and advantages of the present invention will become more readily apparent from the following description, reference being made to the accompanying drawing in which the sole FIGURE is a perspective view diagrammatically showing an apparatus for uranium enrichment by the separating-nozzle process with one end wall broken away.

SPECIFIC DESCRIPTION

The drawing illustrates an apparatus for the separating-nozzle process for isotope separation, especially uranium enrichment, using cascaded stages of the type fully elucidated in my German published application (Auslegeschrift) DT-AS No. 25 42 296 and my U.S. patent identified above. To the extent that the separating nozzle unit, heat exchangers, compressors and modes of operation are the same, therefore, they will not be described in detail here.

It suffices to observe that the apparatus of the present invention comprises a plurality of separating-nozzle stages 1 each of which has a separating nozzle unit (not shown) provided with a heat exchanger 2 and associated with a respective compressor stage of a plurality of compressors 4 disposed wholly within the space defined between the inwardly concave arcuate supports 11 and the cylindrical vessel 8 carried thereby. The compressors can lie wholly within the plan outline of the cylindrical vessel 8.

The individual stages 1 form a cascade 6 and are located in respective compartments or sections 7 of the cylindrical housing defined by diametral partitions 12 which lie in planes perpendicular to the axis of the cylindrical vessel and which are welded to the inner cylindrical wall 8a thereof.

The compressors 4 are provided with fittings 9 flanged to downwardly extending connecting pipes 5 which communicate with respective compartments or sections 7 of the vessel as described in application Ser. No. 888,974. Upon disconnection of the flange bolts, the respective compressor can be simply withdrawn and a replacement compressor inserted for maintenance or repair. All of the flange joints lie along a common separating plane P as shown in the drawing.

The support posts 11 which carry the cylindrical vessel 8, and fitting 11a resting along the ground and, in plane P are inwardly and arcuately concave. In addition, they have upwardly concave cradles 11b accommodating the vessel 8 and to which the vessel 8 is peripherally welded.

The heat exchangers 2 of all of the stages 1 and thus in all of the compartments or sections 7 of the apparatus lie at the same level so that they can be defined by rectilinear heat exchanger tubes 3 which extend continuously through all compartments or sections 7 of the apparatus. Each tube 3 thus passes through a respective bore in each of the partitions 12 and can be peripherally welded to each partition. At each end of the vessel 8, there is provided a manifold 13 or 13a for supply of fluid to and removal of the cooling fluid from the tubes 3. The manifold 13 or 13a may have a box-like configuration so that all of the tubes 3 are fed in parallel or may be internally partitioned to feed some of the tubes while diverting fluid from other tubes into still further tubes so that the coolant can pass back and forth along groups of the tubes of the tube bundle forming the heat exchanger. As a consequence, the tube bundle forms a common heat exchanger for all of the stages, the compressed gas of each stage coming into contact with only a limited portion of the length of the tube bundle. The number of tubes and the construction of the feed and discharge manifold chambers 13 and 13a, i.e. the distribution and collection chambers, and the dimensions thereof are dependent upon the desired degree of coolant and the temperature of the cooling water.

In the best mode embodiment of the invention, illustrated in the drawing, the compressors 4 can have their axes parallel to the axis of the vessel 8 and to one another and can be driven through a transmission 20 by a motor or engine 21. The compressors 4 are provided in pairs as shown to either side of a longitudinal median plane M which passes through the axis of the vessel 8 and the shaft 22 of the motor 21.

As the system of my earlier copending application and patent mentioned above, the apparatus illustrated in the drawing operates, in the separating-nozzle process for the enrichment of uranium, as follows:

The first compressor 4 comprises the starting gas containing the uranium isotopes, usually in the form of uranium hexafluoride, with the compressed gas passing through the isotope heat exchanger 2 and thus having compression heat abstracted along a first portion of the length of the tube bundle formed by the tubes 3.

The gas then passes through the separating-nozzle unit 1 corresponding to this heat exchanger with the light fraction being directed along the arrow 14 and mixture with a heavy fraction which is compressed in the next compressor 4 for passage through the next stage in a similar manner. The heavy fraction is led away as shown by arrow 15 and is mixed with a light fraction as described in the aforementioned copending application and my earlier patent.

I claim:

1. In an apparatus for isotope separation having a plurality of separating stages connected in a separation cascade, each of said stages comprising a separating-nozzle unit and a heat exchanger connected upstream from said unit for abstracting heat from the compressed gas forced through said unit, said apparatus also including compressor means for compressing the gas upstream of each of said heat exchangers, the improvement which comprises the combination of:
   a substantially cylindrical hermetically sealed vessel having a generally horizontal axis and subdivided internally by a plurality of diametral partitons defining chambers between them, each of said chambers containing a respective one of said stages;
   means in said vessel supporting said heat exchangers with one another and all at the same level in said vessel, said heat exchangers having common heat exchanger tubes extending substantially the length of said vessel through all of said chambers and through said partitions; and
   a distributor at one end of said vessel for distributing a coolant to said tubes, and a collector at the opposite end of said vessel for collecting coolant from said tubes.

2. The apparatus defined in claim 1 wherein said vessel is supported between a pair of supports defining a space below said vessel, said compressor means being disposed at least in part in said space.

3. The apparatus defined in claim 2 wherein said compressor means includes a plurality of compressors aligned axially with one another parallel to the axis of said vessel.

4. The apparatus defined in claim 3 wherein two pairs of said compressors are provided wholly within the plan outline of said vessel.

5. The apparatus defined in claim 3 wherein said compressors have upwardly extending flange fittings and said vessel has downwardly extending flange fittings meeting the flange fittings of said compressors in a horizontal plane.

6. The apparatus defined in claim 3 wherein said supports are inwardly concave and are located at the ends of said vessel and said compressor means are positioned between them.

* * * * *